United States Patent
Bebinger

[15] 3,695,519
[45] Oct. 3, 1972

[54] HOPPER ASSEMBLY FOR BATCH DISPOSER

[72] Inventor: Jack E. Bebinger, Columbus, Ohio

[73] Assignee: Westinghouse Electric Corporation, Pittsburgh, Pa.

[22] Filed: Nov. 6, 1970

[21] Appl. No.: 87,429

[52] U.S. Cl. ............241/46 B, 241/32.5, 241/100.5, 241/257 G
[51] Int. Cl. ........................................B02c 18/42
[58] Field of Search .....241/32.5, 46 B, 100.5, 257 G

[56] References Cited

UNITED STATES PATENTS

| | | |
|---|---|---|
| 3,084,877 | 4/1963 | Bebinger..................241/46 B |
| 3,425,637 | 2/1969 | Enright et al.............241/32.5 |
| 3,464,638 | 9/1969 | Enright et al..........241/100.5 |

*Primary Examiner*—Granville Y. Custer, Jr.
*Attorney*—F. H. Henson, E. C. Arenz and R. B. Farley

[57] ABSTRACT

The invention provides a batch feed type food waste disposer having a unitized assembly of its hopper and hopper flange, with these two elements shaped so as to be formed from a non-corrosive sheet material such as stainless steel and rolled together or welded at their abutting edges to form a water-tight joint which includes, at the periphery of the joint, a cooperating opening for the stopper-switch that actuates the food waste disposer to an active comminuting condition.

6 Claims, 3 Drawing Figures

HOPPER ASSEMBLY FOR BATCH DISPOSER

BACKGROUND OF THE INVENTION

1. Field of the Invention

This invention relates to food waste disposers and, more particularly, relates to a unitized hopper and hopper flange assembly for a batch feed type food waste disposer.

2. Description of the Prior Art

The use of hopper assemblies formed from sheet material are known to be old in the food waste disposer art, such, for example, being shown in U.S. Pat. No. 3,464,638. In this patent it is seen that the food waste containing housing for the food waste disposer is formed with an upper flange portion which provides a throat for the food waste disposer and with this flange portion being rolled on its outer edge so as to be assembled with the main cylindrical portion of the food containing housing for the food waste disposer. The food waste disposer disclosed in this patent, however, makes no provision for an aperture arrangement which will cooperatively work with a stopper-switch member, provided for actuating the disposer.

The use of an upper opening of a food waste disposer which is cooperatively workable with a stopper-switch member that actuates the food waste disposer to provide a batch processing of food waste, is shown as old in U.S. Pat. No. 3,425,637. In this patent, however, the throat or flange portion of the food waste disposer housing is not directly assembled to the main food waste containing portion thereof, with this assembly being accomplished through the use of a fairly complicated flanging arrangement that includes plastic or elastomeric, gaskets and the like. Thus, the food waste disposer disclosed in this patent does not contemplate the use of a unitized hopper flange and hopper assembly which are formed together at their aperture openings to provide a reinforced aperture which cooperatively associates with a stopper-switch member for the waste disposer unit.

Accordingly, it would be advantageous to provide a simplified throat or hopper flange and hopper assembly which provided the main communication to and a volume for the comminuting disposition of waste food, with these elements directly connected together in a water-tight arrangement and formed from a noncorrosive substance such as stainless steel so that the assemblage of these elements is not only simplified but also durable during the operating life of the food waste disposer in which they were utilized. Further, since the stopper switch element for batch feed food waste disposers normally cooperates with the food delivery aperture formed therein, it would be extremely effective to utilize the roll formed, reinforced connecting means between the hopper flange and hopper as a cooperating, reinforced aperture means for the stopper-switch member.

SUMMARY OF THE INVENTION

The invention provides an assembly of a hopper and hopper flange for a food waste disposer unit in which the hopper and hopper flange are joined by a rolling process to form a water-tight joint therebetween, however, these two parts could also be welded together at this joint. For ease in forming, the hopper flange is substantially cylindrical in elevation and includes a radially inwardly extending portion at its lower end which forms a flange, with which, a corresponding flange of the hopper is rollingly attached. The inwardly extending flange portion on the hopper flange, is shaped to provide a somewhat ovular aperture, with the oval shape having two opposite disposed flattened and straight edges so that an oblong aperture with curved ends is provided. The flange of the hopper is provided with a substantially similar aperture shape, with the rolling process providing an overlap of the hopper flange and the hopper that extends completely around the periphery of the aperture formed.

The hopper, for easy forming, is generally bell shaped in elevation and has a pair of dimpled portions that are formed on the surface of the hopper so as to provide a pair of depressions having substantially flattened bottoms. Apertures extend through these flattened bottoms to accommodate a drain line which may extend to the hopper from a built-in dishwasher or the like and a switch that actuates the batch food waste disposer of the instant invention. The drain element, provided through its respective aperture, is also rolled over the confronting edge of the hopper so as to be fixedly attached to it, while the switch means is dimensioned so as to provide a sealing diameter larger than its aperture to provide a sealing surface for it relative to the food waste disposer hopper.

The bottom of the food waste disposer hopper includes a radially outwardly turned flange for engagement to a connecting flange which serves as the attachment means connecting the hopper to the lower portion of the food waste disposer. This lower portion mounts the motor arrangement that drivingly rotates the comminutor blades which reduce food waste to small particles so that they may be flushed down the household drain.

DRAWING DESCRIPTION

For a better understanding of the invention, reference may be hade to the preferred embodiment, exemplary of the invention, shown in the accompanying drawings in which.

DESCRIPTION OF THE PREFERRED EMBODIMENT

Figure 1:
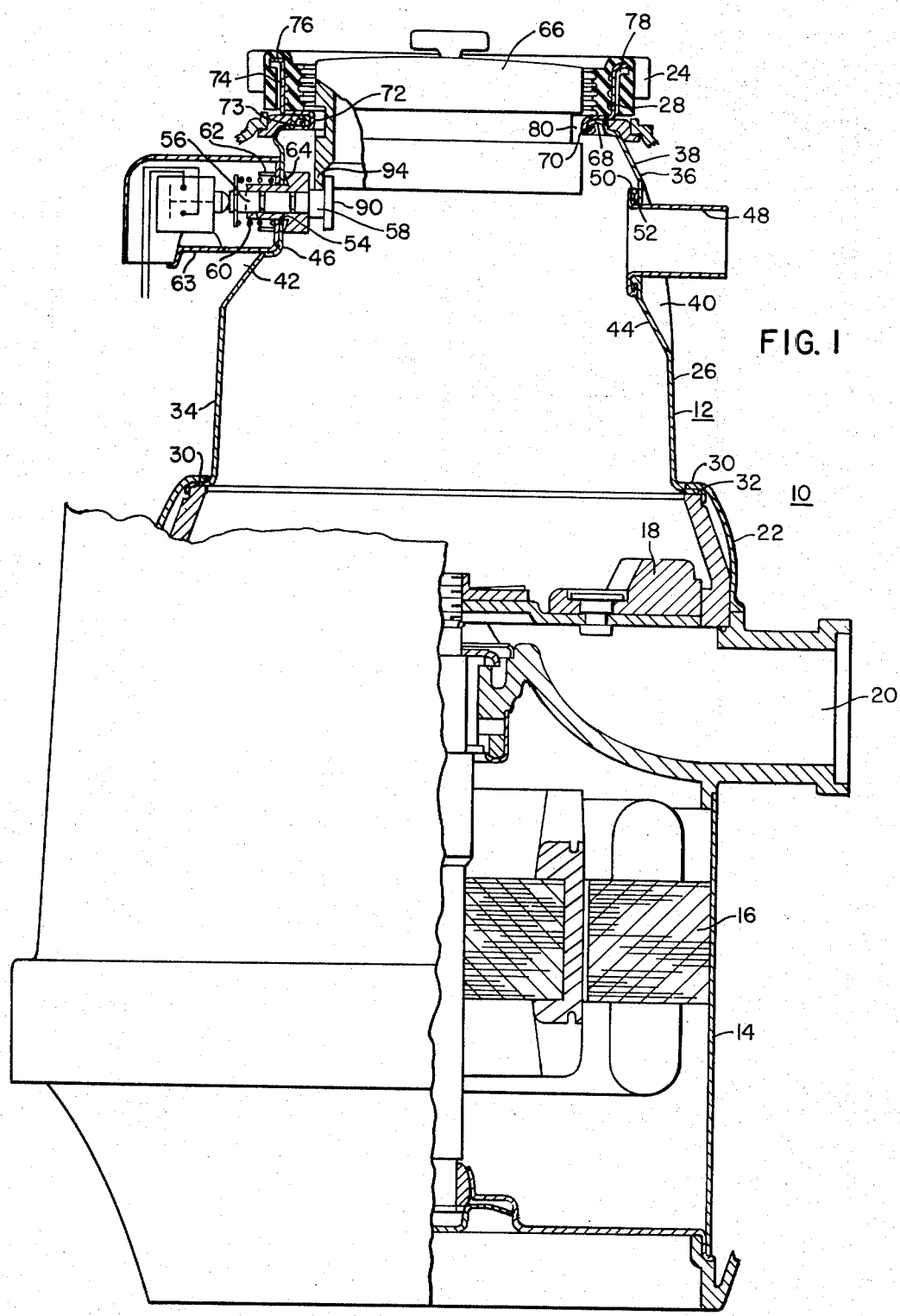
FIG. 1 is a cross-sectional elevational view of a batch food waste disposer which incorporates the principles of my invention.
Figure 2:
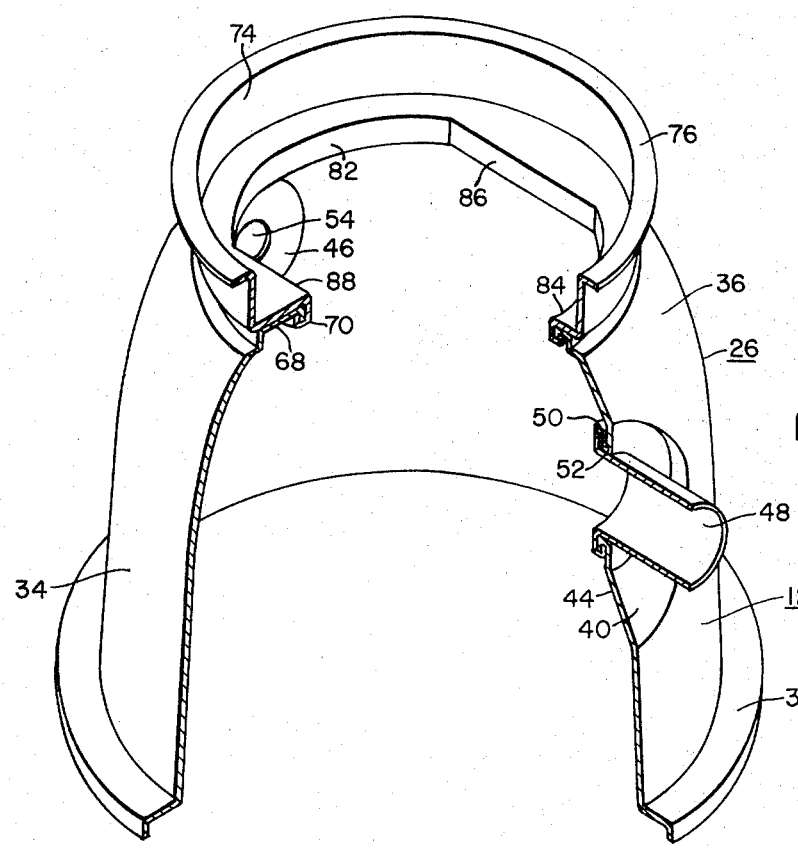
FIG. 2 is a perspective view of the unitary assemblage of the hopper and hopper flange constituting my invention.

Referring specifically to FIG. 1, a food waste disposer 10 can be seen which incorporates the principles of my invention. The food waste disposer 10 is comprised generally of a waste food receiving hopper 12 and a cylindrical housing 14 depending therefrom and within which is disposed a motor 16 and comminutor blades 18 which serve to reduce the food waste placed therein into granular size for easy drainage through a drain 20. The drain 20 is connected to the plumbing (not shown) disposed below a sink on which the food waste disposer 10 is positioned. The cylindrical housing 14 and hopper 12 are attached together by a somewhat bell-shaped flange 22 so as to provide an easily mountable and dismountable assembly of these two elements. The bell shaped flange 22 is attached to cylindrical housing 14 by any conventional means, such as, for example, lug-like projections on this flange (not shown) having bolt apertures and corresponding threaded holes (not shown) in the cylindrical housing 14. Any other conventional fastening means could also be utilized.

The food waste disposer 10 is supported from a sink (not shown) by a support gasket 24 which is sealingly attached and mounted below the drain opening for the sink. Such a mounting arrangement is generally disclosed and shown in my copending U.S. patent application 72,393, filed Sept. 15, 1970 (W.E. 41,445) having the same assignee as this application. Reference may be had thereto for a more thorough knowledge of the method of sink mounting of the food waste disposer 10 of the instant invention.

The novel and unobvious aspects of the instant invention reside in the provision of hopper 12 formed as a two piece unitary assemblage comprising hopper container 26 and hopper flange or cap 28. These two members should preferably be formed of material of deep-drawing quality and which is non-corrosive so as to prevent the gradual destruction of these elements during their functioning as a receiving means for the food waste which is ground by the comminutor blades 18. Such a non-corrosive material may be stainless steel and such is used in the formation of the hopper 12 of the instant invention but other non-corrosive materials which could be formed in a similar manner as the hopper 12 might also advantageously may be utilized.

Hopper container 26 is, in elevation, generally bell-shaped in configuration and includes, at its bottommost portion, a radially outwardly extending annular flange 30 so as to be capable of being placed in compressed engagement with a radially inwardly extending annular flange 32 formed on bell shaped connecting flange 22. By this arrangement, then, the hopper container 26 is placed in a sealingly engaged manner with the connecting flange 22. Immediately upwardly of annular flange 30, the hopper container 26 is provided with a lower section 34 which has only a slight taper so that the bell effect is only slightly defined by this portion to provide a substantially smooth and continuous merging with an upper section 36 of hopper container 26. This section of hopper container 26 tapers inwardly in a non-uniform but smooth manner to form the remainder of the "bell" of hopper container 26. Thus, a smooth transition occurs between the lower section 34 and upper section 36 of hopper container 26 so that, if a difficult forming material such as stainless steel is utilized for the hopper container, it is capable of being drawn into the shape required. It should be noted that a cross section taken anywhere through the lower section 34 or upper section 36 perpendicular to the axis of hopper container 26 will normally yield an annular section, again assuring an easy formed shape.

An annular section, however, would not occur in the following areas. Intermediate the upper and lower terminations of upper section 36 and integrally with its side wall 38 are a pair of dimpled portions 40 and 42 that are substantially diametrically opposed to each other. On upper section 36, each of these offset portions is terminated by an inner wall 44 or 46, with each of these walls also being integral with side wall of 38. Because of the inward taper or convergent relationship of side 38 at the location of the offset portions 40 and 42, the dimpled effect is much more pronounced at the lower portions of each of these offsets.

Disposed within the offset 40, is a conduit or tube 48, with this conduit being rolled over to provide an overlapping flange 50 which engages behind a rolled over flange 52 forming a portion of the inner wall 44. The tube 48 is thereby sealingly attached to hopper container 26 and provides an easy attachment for a hose or conduit (not shown) extending from a built-in dishwasher or the like. Hopper container 26 may thereby receive discharge from such a dishwasher and any food waste material in this discharge can be comminuted by comminutor blades 18.

The inner wall 46 of the offset portion 42 includes a bore 54 extending therethrough for the mounting of a switch 56 that serves as an actuating means for food waste disposer 10. Switch 56 is actuated by movement of a plunger 58 thereof in a reciprocating motion, with the switch 56 illustrated in its off position. The plunger 58 is urged outwardly to this position by a spring biasing means 60. The switch is also retained in a tight-sealing relationship with hopper container 26 by spring biasing means 60 acting through a spring retainer 62 which is biased thereby into abutting position against a housing 63 of switch 56 which, in turn, sealingly abuts the outer periphery of side wall 38. A washer 64 mounted on switch 56, also engaged the internal peripheral surface of side wall 38 also through the biasing of spring biasing means 60. Switch 56 is thereby mounted in a tight and sealed relationship relative to the hopper 12 with its plunger 58 disposed inwardly of the side wall 38 so as to be engageable by a stopper switch actuating member 66.

The upper edge of hopper container 26 merges into an inwardly turned flange 68 having a generally C-shape in cross section to thereby aid in its forming and also to provide additional strengthening to the flange 68 and to yield a downwardly turned end 70. Hopper flange or cap 28, in turn, includes an inwardly turned and rolled over flange 72, a generally cylindrical portion 74 joined thereto and an upper, radially outwardly turned flange portion 76. The flange portion 74 and the flange portion 76 serve as an insertion means which is mounted in a right angled, annular groove 78 integrally contained in support flange 24. Flange 24, of course, comprises an elastomeric material so that the flange portions 74 and 76 of hopper flange 28 may be resiliently compressingly inserted therein so that connection of supporting flange 24 upwardly with additional mounting means for the food waste disposer 10 places the illustrated portions of food waste disposer 10 (FIG. 1) in a depending, resiliently mounted relationship.

Figure 3:
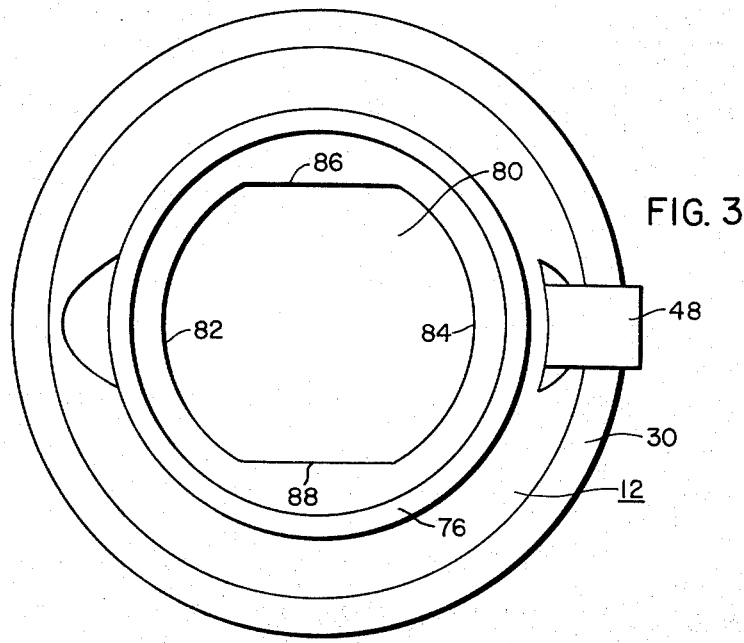
FIG. 3 is a plan view of the hopper and hopper flange.

In order to sealingly mount the hopper flange 28 to the hopper container 26 the aforementioned flange 68 and downturned end 70 of hopper container 26 have rolled thereover the flange 72 of hopper flange 28 to form an outwardly and upwardly turned end 73 of flange 72. The rolled over flange 72 of hopper flange 28 thereby forms the periphery of an aperture 80 through which the stopper-switch actuating member 66 is inserted to actuate switch 56. The aperture 80 is formed in the shape of an oval with two parallel sides (FIG. 3), with the curved portion thereof being denoted 82 and 84 and the linearly aligned portions thereof being denoted 86 and 88. The shape of the aperture 86 so provided not only yields an easily formed seam between the hopper container and hopper flange but also provides a shape which is complementary to the shape of the stopper switch actuating member 66 so that the same may be turned and aligned with the aperture 80 (FIG. 1) to extend downwardly through it and engage a plunger head 90 of the plunger 58. This engagement occurs because a cam surface switch actuating member 94 for stopper switch actuating member 66 will abut, upon the turning of the stopper switch actuating member 66, behind the plunger head 90. The turning of stopper switch actuating member 66 will then urge the plunger 58 inwardly relative to hopper container 26 against the spring biasing means 60 thereby actuating switch 56 to an "on" condition so as to energize electric motor 16 and provide a rotation force to comminutor blades 18 for the reduction of food waste previously placed within the hopper container 26.

The operation of food waste disposer 10 should be fairly obvious from the preceding description. In order to comminute a batch of food waste, the stopper-switch actuating member 66 is removed from the hopper 12 and waste food is inserted within the hopper container 26. Stopper-switch actuating member 66 is then again placed within the top of hopper 12 and rotated until the contiguous shape of stopper switch actuating member 66 mates with aperture 80 so that the stopper switch actuating member 66 moves downwardly placing the cam surface 94 at the same level as plunger head 90. Further rotational movement of stopper-switch actuating member 66, then, causes the switch 56 to be actuated and the comminution of waste food to be carried on. After completion of this comminution process, an additional batch of waste food may be placed within food waste disposer 10 and the process repeated.

It should be obvious to one skilled in the art that a food waste disposer has been described which provides all the advantages set out for it and that many alterations could be made to it which would still be within the spirit and scope of the description offered.

What is claimed is:

1. In a food waste disposer:
   a hopper of relatively thin, deep-drawing-quality metal having a radially inwardly-directed flange at its upper end;
   a hopper cap of relatively thin, deep-drawing-quality metal, formed separately from said hopper, and having a radially inwardly-directed flange at its lower end;
   the inner marginal edge portion of one of said flanges being rolled over the inner marginal edge portion of the other flange to permanently attach said hopper and hopper cap together in water-tight sealing relation and to form a rolled inner rim defining the boundaries of a preselected-shape opening of restricted cross-sectional area relative to the cross-sectional area of the remainder of said cap and hopper.

2. In a food disposer according to claim 1 wherein:
   said flange of said cap is rolled over said inner marginal edge portion of said flange of said hopper to form said rolled inner rim.

3. In a food waste disposer according to claim 1 including:
   a stopper means for said opening;
   said stopper means includes a portion thereof having a shape complementary to the preselected shape of said opening.

4. In a food waste disposer according to claim 3 wherein:
   said preselected shape is that of a flattened oval.

5. In a food waste disposer according to claim 1 wherein:
   said metal of said hopper and hopper cap is stainless steel.

6. In a food waste disposer according to claim 1 wherein:
   said hopper is generally bell-shaped.

* * * * *